Nov. 21, 1961 W. W. BILLINGS 3,010,096
COUNTER CIRCUIT
Filed Dec. 27, 1957 2 Sheets-Sheet 1

United States Patent Office 3,010,096
Patented Nov. 21, 1961

3,010,096
COUNTER CIRCUIT
William W. Billings, Pittsburgh, Pa., assignor to Westinghouse Electric Corporation, East Pittsburgh, Pa., a corporation of Pennsylvania
Filed Dec. 27, 1957, Ser. No. 705,584
8 Claims. (Cl. 340—174)

This invention relates to counter circuits in general, and in particular to counter circuits which utilize logic elements.

It is an object of this invention to provide an improved counter circuit.

It is a further object of this invention to provide an improved counter circuit utilizing logic elements composed of reliable, durable and maintenance-free elements.

It is still another object of this invention to provide a counter circuit having resetting and presetting means.

Further objects of this invention will become apparent when the following description is taken in conjunction with the accompanying drawing. In said drawing, for illustrative purposes only, there is shown a preferred embodiment of the invention.

In said drawing, the manner in which the windings have been wound upon the saturable magnetic core is denoted by the polarity dot convention. That is, current flowing into the polarity dot end of the winding will drive the associated core toward positive saturation. Current flowing out of the polarity dot end of a winding will drive the associated core away from positive saturation.

Figure 1:
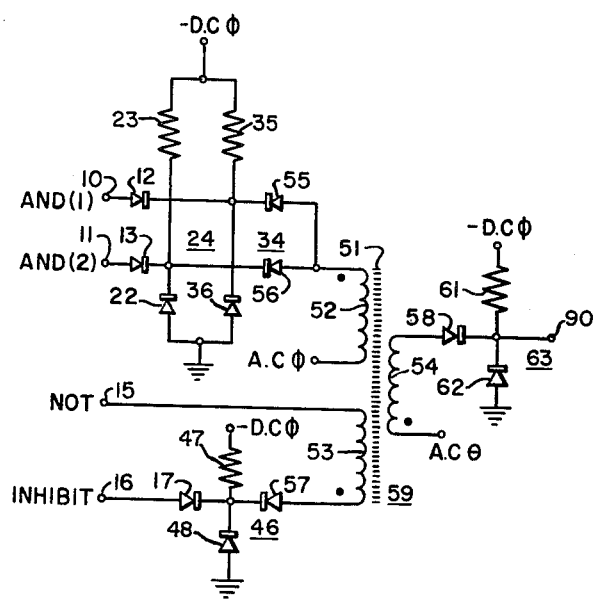
Figure 2:
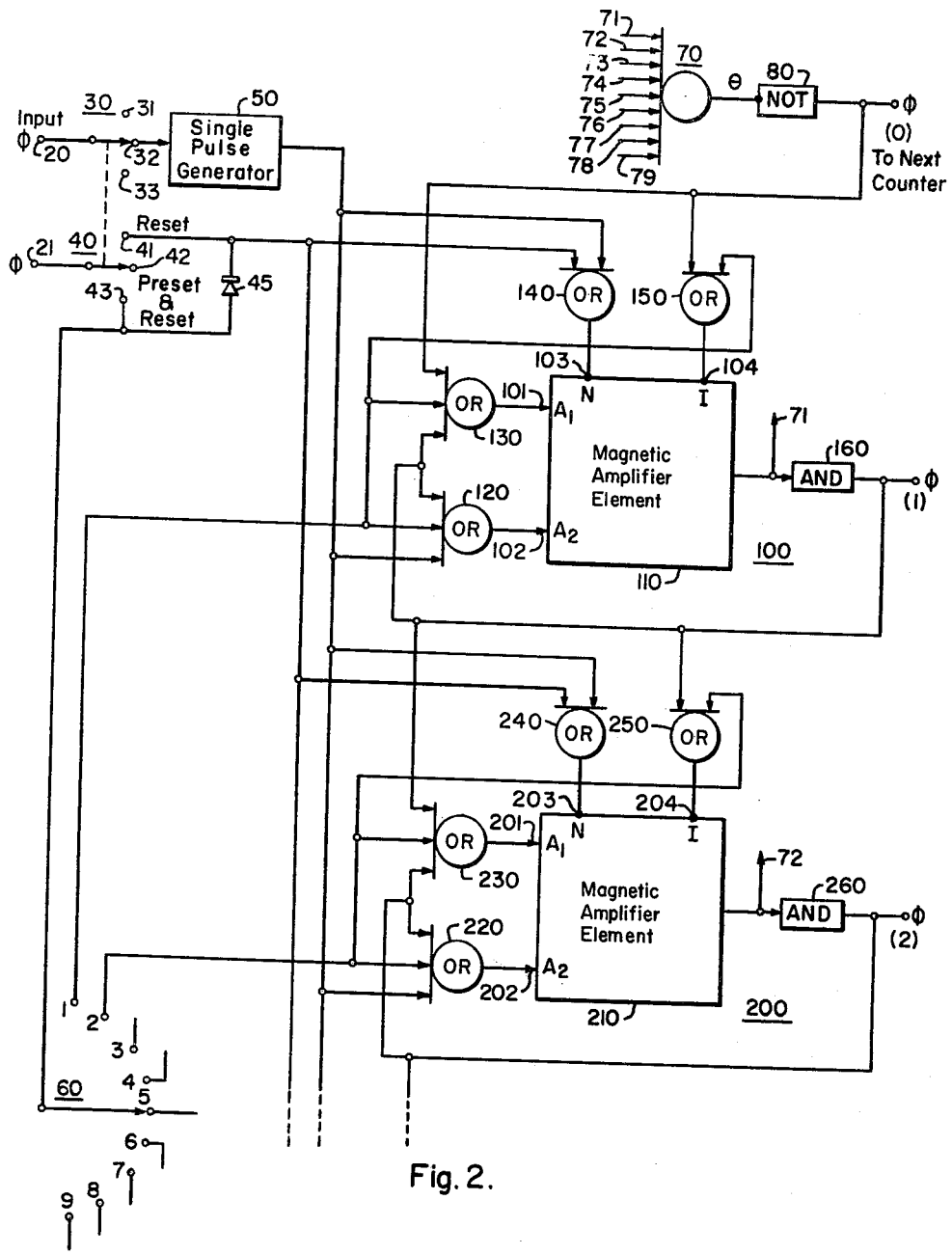

FIG. 1 is a schematic diagram of a magnetic amplifier circuit to be utilized in this invention; and FIG. 2 is a block diagram of a counter circuit embodying the teachings of this invention.

Referring to FIG. 1 there is illustrated a magnetic amplifier 59 comprising a saturable magnetic core member 51 having inductively disposed thereon a first reset winding 52, a second reset winding 53 and an output winding 54.

One lead of the first reset winding 52 is connected to a first AND input terminal 10 through a rectifier 55 and a rectifier 12. This lead of the reset winding 52 is also connected to a second AND input terminal 11 through a rectifier 56 and a rectifier 13. A non-linear circuit 24 comprising a resistance 23 and a rectifier 22 is connected between a source of negative, half-wave direct-current of the $\phi$ phase and ground. The junction of the resistand 23 and rectifier 22 is connected to the junction of the rectifiers 13 and 56. A non-linear circuit 34 comprising a resistance 35 and a rectifier 36 is also connected between the source of negative, half-wave direct-current of the $\phi$ phase and ground. The junction of the resistance 35 and the rectifier 36 is connected to the junction of the rectifiers 12 and 55. An alternating-current voltage source of the $\phi$ phase is to be connected between the other lead of the first reset winding 52 and ground.

The second reset winding 53 is connected in series circuit relationship with a rectifier 57 and a rectifier 17 between a NOT input terminal 15 and an INHIBIT input terminal 16. A non-linear circuit 46 comprising a resistance 47 and a rectifier 48 is connected between a source of negative, half-wave direct current of the $\phi$ phase and ground. A junction of the resistance 47 and the rectifier 48 is connected to the junction of the rectifier 17 and 57.

The output winding 54 is connected between a source of alternating-current voltage of the $\theta$ phase and an output terminal 90 through a rectifier 58. A non-linear circuit 63 comprising a resistance 61 and a rectifier 62 is connected between a source of negative, half-wave direct current of the $\theta$ phase and ground. The output terminal 90 is connected to the junction of the resistance 61 and the rectifier 62.

The magnitude of the alternating-current voltage sources hereinbefore referred to is sufficient to drive the saturable magnetic core member 51 to positive or negative saturation depending upon the winding to which they are applied. The $\theta$ phase and the $\phi$ phase designates voltages having the same frequency but being 180° out of phase.

The operation of the non-linear circuits included in FIG. 1 is well-known in the art and will not be described in detail here. It will suffice to say that the non-linear circuit allows the application of a predetermined amount of excitation current to each winding thereby limiting overloading the apparatus illustrated in FIG. 1.

The operation of the apparatus illustrated in FIG. 1 is as follows. The alternating-current voltages of the $\theta$ and $\phi$ phases as they are applied to the output winding 54 and the first reset winding 52, respectively, alternately drive the saturable magnetic core member 51 to and away from positive saturation. The cycling of the flux in the core 51 continues until the application of various combinations of input signals to the first and second reset windings 52 and 53.

The application of an input signal of the proper phase and magnitude to the terminal 10 will block the flow of current from the reset winding 52 at the rectifier 55. Similarly, an input signal to the terminal 11 of the proper phase and magnitude will block the flow of current from the first reset winding 52 at the rectifier 56. It may thus be seen that input signals of the proper phase and magnitude are required to be applied simultaneously to the terminals 10 and 11 in order to prevent the resetting action of the alternating current voltage of the $\phi$ phase through the windings 52 to the core 51. The input signal to be applied to the NOT input 15 will be of a sufficient magnitude to drive the magnetic core member 51 to negative saturation if it is of the $\phi$ phase. Examination of the circuit reveals, however, that a signal of the same phase and of at least like magnitude when applied to the INHIBIT input terminal 16 will block the application of the NOT input signal to the reset winding 53.

If by any combination of the above input signals the saturable magnetic core is not driven to negative saturation on the $\phi$ half-cycle, then on the next or $\theta$ half-cycle the saturable magnetic core member 51 will still be saturated and an output will appear at the terminal 90.

Thus we see that the magnetic amplifier 59 illustrated in FIG. 1 performs in the following manner. An output will appear at the terminal 90 when, and only when, input signals are present at both the terminals 10 and 11. However, an input signal at the NOT terminal 15 will prevent an output at the terminal 90 unless this input at the terminal 15 is nullified by an INHIBIT input at the terminal 16.

Referring to FIG. 2, there is illustrated a block diagram of a counter circuit embodying the teachings of this invention. A review of logic circuit functions as employed in this diagram will briefly explain their functions. A NOT logic circuit produces an output at all times unless an input signal is present. The AND logic circuit produces an output when, and only when, all of a plurality of input signals are present. A MEMORY circuit produces an output whenever it receives an input signal and continues to produce this output, even though the ON input signal is removed, until an OFF signal is received. An OR circuit produces an output when any of a plurality of input signals is present.

Referring again to FIG. 2, the input to the counter circuit is applied to the terminal 20. The terminal 20 is connected to a switching means 30 which has three positions 31, 32 and 33. The 31 and 33 positions are dead or nonconnected positions. The position 32 is connected to a single pulse generator 50. The output of the single pulse generator 50 is connected through an OR circuit 140 to the NOT input 103 of the element 110. The output of the single pulse generator 50 is also connected through an OR circuit 120 to the AND input terminal 102 of the element 110. The block diagram of the elements 110 and 210 are representative of the apparatus as is illustrated in FIG. 1. Shown by legend are the two AND inputs, the NOT input and the INHIBIT input. The single pulse generator 50 is also connected to the NOT input 203 and the AND input 202 of the element 210 and may be similarly connected to a plurality of other elements (identical to the apparatus illustrated in FIG. 1) depending upon how high the counter circuit is to count.

A NOT circuit 80 has its output connected to the INHIBIT terminal 104 of the element 110 and to the AND terminal 101 of the element 110. The output of the element 110 is connected through a terminal 71 of the OR circuit 70 to the input of the NOT element 80. The output of the element 110 is also connected to a single input AND circuit 160. The output of the AND circuit 160 is connected through the OR circuits 120 and 130 to the AND inputs 102 and 101, respectively. The output of the AND element 160 is also connected to the INHIBIT input 204 and the AND input 201 of the succeeding element 210.

The element 110 and the AND circuit 160 act in combination to provide a MEMORY circuit. As was explained hereinbefore on the operation of the element 110 when input signals are received at both the AND terminals 101 and 102 an output will result from the element 110 to the AND circuit 160. This output to the AND circuit 160 causes an output from the AND circuit 160 and its output is fed back to the AND input terminals 101 and 102 of the element 110 thereby keeping the MEMORY circuit 100, composed of the element 110 and the AND circuit 160, turned ON. The MEMORY circuit 100 may be turned OFF by the application of an input signal to the NOT terminal 103 providing there is not an input also simultaneously present at the INHIBIT terminal 104.

Similarly, the element 210 and the element 260 combine to form a MEMORY circuit 200. The output of the AND circuit 260 is fed back to the AND input terminals 201 and 202 of the element 210. The output of the element 210 is connected through the terminal 72 of the OR circuit 70 to the input of the NOT circuit 80.

In operation, a signal is received in the input terminal 20 which causes the single pulse generator 50 to have an output of one pulse. The NOT circuit 80 is already producing an output to the INHIBIT terminal 104 and the AND terminal 101 of the element 110. Therefore, the output of the single pulse generator 50 to the NOT input terminal 103 will be of no effect as to resetting the element 110. However, the output from the generator 50 to the AND terminal 102 will turn the MEMORY circuit 100 on. When the element 110 products an output through the OR circuit 70, the NOT circuit 80 ceases producing an output.

With the MEMORY circuit 100 now turned on, an output is being fed to the INHIBIT terminal 204 and the AND terminal 201 of the succeeding element 210. Therefore, the next pulse output from the single pulse generator 50 will turn the MEMORY circuit 200 on. Since the output to the INHIBIT terminal 104 of the element 110 from the NOT circuit 80 has been removed, this second pulse from the generator 50 will turn the MEMORY circuit 100 off through its application to the NOT input terminal 103 of the element 110.

Thus the counter will move down through a plurality of MEMORY circuits as each successive pulse is received from the single pulse generator 50. The output of the NOT circuit 80 is used as the "zero" indicator, the output of the MEMORY circuit 100 is utilized as the "one" indicator, the output of the MEMORY circuit 200 is utilized as the "two" indicator, etc.

Provision is made for resetting and presetting the counter illustrated in FIG. 2 by the following apparatus. A resetting or presetting voltage is applied to the terminal 21. The terminal 21 is connected to a switch 40 having the positions 41, 42 and 43. The position 42 is a dead position. Switches 30 and 40 are ganged to operate together. The position 42 of the switch 40 will coincide with the position 32 of the switch 30. Similarly, positions 41 and 31 and the positions 43 and 33 will coincide. The position 41 is connected to the NOT input terminals 103, 203, ... of the elements 110, 210, ...

In operation, when the gang switches 40 and 30 are turned to the positions 31 and 41, respectively, the input to the single pulse generator 50 is interrupted. The application of a resetting voltage to the terminal 21 provides the application of a resetting signal to all the NOT input terminals of the plurality of MEMORY circuits thereby resetting the counter to zero.

The counter may be preset by turning the ganged switches 40 and 30 to the positions 43 and 33, respectively. The application of the preset voltage to the terminal 21 resets the entire counter through the rectifier 45, as described in the paragraph above, and also sends a preset signal through the switch 60 to the preselected MEMORY circuit turning it on. That is, since each position of the selector switch 60 is connected to both AND inputs and to the INHIBITOR input of the desired MEMORY circuit. This MEMORY circuit will be turned on. Therefore, the counter will start counting from the preselected MEMORY circuit or indicator.

The counter apparatus illustrated in FIG. 2 may be modified in the following manner. The elements 110, 210, etc. may be constructed to have only one AND input. If such is the case then the output of a particular MEMORY circuit is fed back to its own single AND input and also connected to the INHIBIT input of the succeeding MEMORY circuit of the plurality of MEMORY circuits.

The apparatus illustrated in FIG. 2 therefore provides an improved counter circuit composed of elements that are reliable, durable and maintenance-free. The counter may be preset to any desired number or reset to zero. The counter may be connected to operate as a portion of a series of counters by connecting the output of the NOT circuit to the input of a succeeding counter which will perform in the same fashion as the apparatus illustrated in FIG. 2. The counter may also be connected to a succeeding counter by connecting the output of the last of said plurality of MEMORY circuits, plus the output of said single pulse generator 50, through a two-input AND circuit to a succeeding counter. This two-input AND circuit therefore will fulfill the function of the single pulse generator 50 in the apparatus illustrated in FIG. 2.

In conclusion, it is pointed out that while the illustrated example constitutes a preferred embodiment of my invention, I do not limit myself to the exact details shown, since modification of the same may be varied without departing from the scope and spirit of this invention.

I claim as my invention:

1. In a counter circuit, in combination; counter input means; NOT circuit means; and a plurality of MEMORY circuits; each of said plurality of MEMORY circuits comprising a NOT element, a multi-input AND element, and a single input AND element, said multi-input AND element having a first and a second AND input means, said NOT element having a NOT input means and an INHIBIT input means; said single input AND element connected to provide a MEMORY circuit output upon receipt of an output from said multi-input AND element; said multi-input AND element being operative to produce an output when input signals are present at both of said first and second AND input means; said NOT element operatively connected to prevent an output from said multi-input AND element upon receipt of an input signal at said NOT input means unless an input signal is applied substantially simultaneously to said INHIBIT input means; said MEMORY circuit output being fed back to its associated first and second AND input means; said counter input means being connected to said NOT input means and said second AND input means of each of said plurality of MEMORY circuits to provide an input signal thereto upon occurrence of a counter input signal to said counter input means; the output of said NOT circuit means being connected to said INHIBIT input means and said first AND input means of a first MEMORY circuit of said plurality of MEMORY circuits to provide an input signal thereto; the output of each said MEMORY circuit being connected to the input of said NOT circuit means; the output of each of said MEMORY circuits being connected to said INHIBIT input means and said first AND input means of a succeeding MEMORY circuit.

2. In a counter circuit, in combination; counter input means; NOT circuit means; and a plurality of MEMORY circuits; each of said plurality of MEMORY circuits comprising a magnetic amplifier circuit and an AND element; said magnetic amplifier circuit including a saturable magnetic core member having inductively disposed thereon an output winding means, a NOT reset winding means, and a multi-input AND reset winding means, said multi-input AND reset winding means having a first and a second AND input means; said NOT reset winding means having a NOT input means and an INHIBIT input means; the output winding means of said magnetic amplifier circuit connected to said AND element; the output of said AND element being the output from the MEMORY circuit and being fed back to its associated first and second AND input means; each said MEMORY circuit being operative to produce an output when input signals are present at both of said first and second AND input means; an input signal at said NOT input means being operative to prevent an output from said MEMORY circuit unless an input signal is applied substantially simultaneously to said INHIBIT input means; said counter input means being connected to said NOT input means and said second AND input means of each of said plurality of MEMORY circuits to provide an input signal thereto upon occurrence of a counter input signal to said counter input means; the output of said NOT circuit means being connected to said INHIBIT input means and said first AND input means of a first MEMORY circuit of said plurality of MEMORY circuits to provide an input signal thereto; the output of each said MEMORY circuit being connected to the input of said NOT circuit means; the output of each said MEMORY circuits being connected to said INHIBIT input means and said first AND input means of a succeeding MEMORY circuit.

3. In a counter circuit, in combination; counter input means; NOT circuit means; and a plurality of MEMORY circuits; said NOT circuit means being operative to produce an output unless an input signal is applied to said NOT circuit means; each of said plurality of MEMORY circuits comprising a magnetic amplifier circuit and an AND element; said magnetic amplifier circuit including a saturable magnetic core member having inductively disposed thereon an output winding means, a NOT reset winding means, and a multi-input AND reset winding means; said multi-input AND reset winding means having a first and a second AND input means; said NOT reset winding means having a NOT input means and an INHIBIT input means; the output winding means of said magnetic amplifier circuit connected to said AND element; the output of said AND element being the output from the MEMORY circuit and being fed back to its associated first and second AND input means; each said MEMORY circuit being operative to produce an output when input signals are present at both of said first and second AND input means; an input signal at said NOT input means being operative to prevent an output from said MEMORY circuit unless an input signal is applied substantially simultaneously to said INHIBIT input means; said counter input means being connected to said NOT input means and said second AND input means of each of said plurality of MEMORY circuits to provide an input signal thereto upon occurrence of a counter input signal to said counter input means; the output of said NOT circuit means being connected to said INHIBIT input means and said first AND input means of a first MEMORY circuit of said plurality of MEMORY circuits to provide an input signal thereto; the output of each said MEMORY circuit being connected to the input of said NOT circuit means; the output of each of said MEMORY circuits being connected to said INHIBIT input means and said first AND input means of a succeeding MEMORY circuit.

4. In a counter circuit, in combination; counter input means; NOT circuit means; a reset circuit; and a plurality of MEMORY circuit elements; said NOT circuit means being operative to produce an output unless an input signal is applied to said NOT circuit means; each of said plurality of MEMORY circuits comprising a magnetic amplifier circuit and an AND element; said magnetic amplifier circuit including a saturable magnetic core member having inductively disposed thereon an output winding means, a NOT reset winding means, and a multi-input AND reset winding means; said multi-input AND reset winding means having a first and a second AND input means; said NOT reset winding means having a NOT input means and an INHIBIT input means; the output winding means of said magnetic amplifier circuit connected to said AND element; the output of said AND element being the output from the MEMORY circuit and being fed back to its associated first and second AND input means; each said MEMORY circuit being operative to produce an output when input signals are present at both of said first and second AND input means; an input signal at said NOT input means being operative to prevent an output from said MEMORY circuit unless an input signal is applied substantially simultaneously to said INHIBIT input means; said counter input means being connected to said NOT input means and said second AND input means of each of said plurality of MEMORY circuits to provide an input signal thereto upon occurrence of a counter input signal to said counter input means; the output of said NOT circuit means being connected to said INHIBIT input means and said first AND input means of a first MEMORY circuit of said plurality of MEMORY circuits to provide an input signal thereto; the output of each said MEMORY circuit being connected to the input of said NOT circuit means; the output of each of said MEMORY circuits being connected to said INHIBIT input means and said first AND input means of a succeeding MEMORY circuit; said reset circuit comprising means for applying a reset signal to said NOT input means of each of said plurality of MEMORY circuits.

5. In a counter circuit, in combination; counter input means; NOT circuit means; a reset circuit; and a plurality of MEMORY circuit elements; said NOT circuit means being operative to produce an output unless an input signal is applied to said NOT circuit means; each of said plurality of MEMORY circuits comprising a magnetic amplifier circuit and an AND element; said magnetic amplifier circuit including a saturable magnetic core member having inductively disposed thereon an output winding means, a NOT reset winding means, and a multi-input AND reset winding means; said multi-input AND reset winding means having a first and a second AND input means; said NOT reset winding means having a NOT input means and an INHIBIT input means; the output winding means of said magnetic amplifier circuit connected to said AND element; the output of said AND element being the output from the MEMORY circuit and being fed back to its associated first and second AND input means; each said MEMORY circuit being operative to produce an output when input signals are present at both of said first and second AND input means; an input signal at said NOT input means being operative to prevent an output from said MEMORY circuit unless an input signal is applied substantially simultaneously to said INHIBIT input means; said counter input means being connected to said NOT input means and said second AND input means of each of said plurality of MEMORY circuits to provide an input signal thereto upon occurrence of a counter input signal to said counter input means; the output of said NOT circuit means being connected to said INHIBIT input means and said first AND input means of a first MEMORY circuit of said plurality of MEMORY circuits to provide an input signal thereto; the output of each said MEMORY circuit being connected to the input of said NOT circuit means; the output of each of said MEMORY circuits being connected to said INHIBIT input means and said first AND input means of a succeeding MEMORY circuit; said reset circuit comprising means for applying a reset signal to said NOT input means of each of said plurality of MEMORY circuits while interrupting the application of a counter input signal to said counter input means.

6. In a counter circuit, in combination; counter input means; NOT circuit means; a reset circuit; a preset circuit; and a plurality of MEMORY circuit elements; said NOT circuit means being operative to produce an output unless an input signal is applied to said NOT circuit means; each of said plurality of MEMORY circuits comprising a magnetic amplifier circuit and an AND element; said magnetic amplifier circuit including a saturable magnetic core member having inductively disposed thereon an output winding means, a NOT reset winding means, and a multi-input AND reset winding means; said multi-input AND reset winding means having a first and a second AND input means; said NOT reset winding means having a NOT input means and an INHIBIT input means; the output winding means of said magnetic amplifier circuit connected to said AND element; the output of said AND element being the output from the MEMORY circuit and being fed back to its associated first and second AND input means; each said MEMORY circuit being operative to produce an output when input signals are present at both of said first and second AND input means; an input signal at said NOT input means being operative to prevent an output from said MEMORY circuit unless an input signal is applied substantially simultaneously to said INHIBIT input means; said counter input means being connected to said NOT input means and said second AND input means of each of said plurality of MEMORY circuits to provide an input signal thereto upon occurrence of a counter input signal to said counter input means; the output of said NOT circuit means being connected to said INHIBIT input means and said first AND input means of a first MEMORY circuit of said plurality of MEMORY circuits to provide an input signal thereto; the output of each said MEMORY circuit being connected to the input of said NOT circuit means; the output of each of said MEMORY circuits being connected to said INHIBIT input means and said first AND input means of a succeeding MEMORY circuit; said reset circuit comprising means for applying a reset signal to said NOT input means of each of said plurality of MEMORY circuits while interrupting the application of a counter input signal to said counter input means; said preset circuit comprising means for applying a preset signal to said first and second AND input means of a preselected MEMORY circuit of said plurality of MEMORY circuits.

7. In a counter circuit, in combination; counter input means; NOT circuit means; a reset circuit; a preset circuit; and a plurality of MEMORY circuit elements; said NOT circuit means being operative to produce an output unless an input signal is applied to said NOT circuit means; each of said plurality of MEMORY circuits comprising a magnetic amplifier circuit and an AND element; said magnetic amplifier circuit including a saturable magnetic core member having inductively disposed thereon an output winding means, a NOT reset winding means, and a multi-input AND reset winding means; said multi-input AND reset winding means having a first and a second AND input means; said NOT reset winding means having a NOT input means and an INHIBIT input means; the output winding means of said magnetic amplifier circuit connected to said AND element; the output of said AND element being the output from the MEMORY circuit and being fed back to its associated first and second AND input means; each said MEMORY circuit being operative to produce an output when input signals are present at both of said first and second AND input means; an input signal at said NOT input means being operative to prevent an output from said MEMORY circuit unless an input signal is applied substantially simultaneously to said INHIBIT input means; said counter input means being connected to said NOT input means and said second AND input means of each of said plurality of MEMORY circuits to provide an input signal thereto upon occurrence of a counter input signal to said counter input means; the output of said NOT circuit means being connected to said INHIBIT input means and said first AND input means of a first MEMORY circuit of said plurality of MEMORY circuits to provide an input signal thereto; the output of each said MEMORY circuit being connected to the input of said NOT circuit means; the output of each of said MEMORY circuits being connected to said INHIBIT input means and said first AND input means of a succeeding MEMORY circuit; said reset circuit comprising means for applying a reset signal to said NOT input means of each of said plurality of MEMORY circuits while interrupting the application of a counter input signal to said counter input means; said preset circuit comprising means for applying a preset signal to said first and second AND input means of a preselected MEMORY circuit of said plurality of MEMORY circuits while interrupting the application of an input signal to said counter input means.

8. In a counter circuit, in combination; counter input means; NOT circuit means; and a plurality of MEMORY circuits; each of said plurality of MEMORY circuits comprising a magnetic amplifier circuit and an AND element; said magnetic amplifier circuit including a saturable magnetic core member having inductively disposed thereon an output winding means, a NOT reset winding means, and an AND reset winding means; said AND reset winding means having an AND input means; said NOT reset winding means having a NOT input means and an INHIBIT input means; the output circuit means of said magnetic amplifier circuit connected to said AND element, the output of said AND element being the output from the memory circuit and being fed back to its associated AND input means; each said MEMORY circuit being operative to produce an output when an input signal is present at said AND input means; an input signal at said NOT input means being operative to prevent an output from said MEMORY circuit unless an input signal is applied substantially simultaneously to said INHIBIT input means; said counter input means being connected to said NOT input means and said AND input means of each of said plurality of MEMORY circuits to provide an input signal thereto upon occurrence of a counter input signal to said counter input means; the output of said NOT circuit means being connected to said INHIBIT input means and said AND input means of a first MEMORY circuit of said plurality of MEMORY circuits to provide an input signal thereto; the output of each said MEMORY circuit being connected to the input of said NOT circuit; the output of each said MEMORY circuit being connected to said INHIBIT input means and said AND input means of a succeeding MEMORY circuit.

References Cited in the file of this patent

UNITED STATES PATENTS

| | | |
|---|---|---|
| 2,519,513 | Thompson | Aug. 22, 1950 |
| 2,673,337 | Avery | Mar. 23, 1954 |
| 2,760,085 | Van Nice | Aug. 21, 1956 |
| 2,772,370 | Bruce | Nov. 27, 1956 |
| 2,778,955 | Isborn | Jan. 22, 1957 |
| 2,824,698 | Van Nice | Feb. 25, 1958 |